Patented Dec. 15, 1953

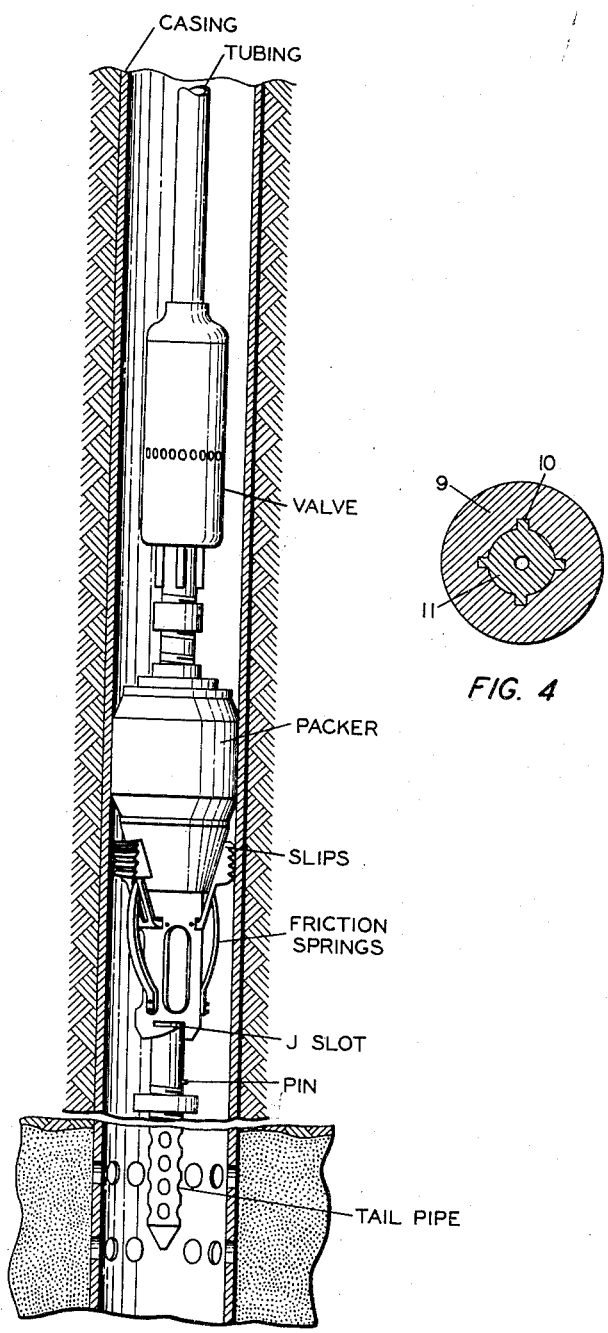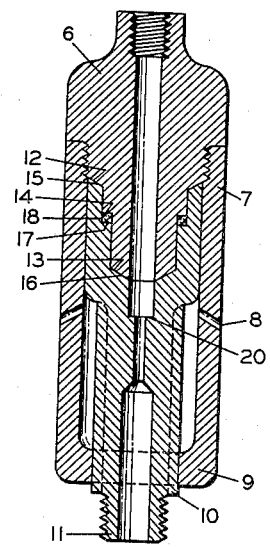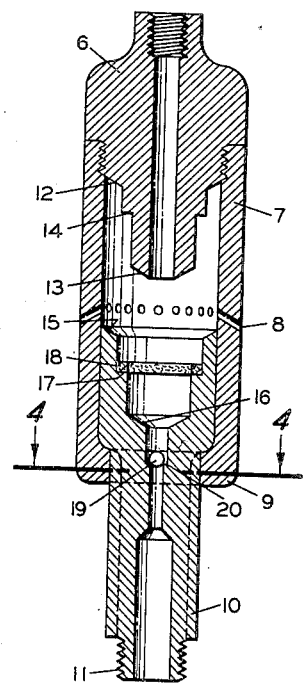

2,662,548

UNITED STATES PATENT OFFICE 2,662,548

TELESCOPING BORED-PLUG SUBCIRCULATION VALVE

Robert Collins Pryor, Bartlesville, Okla., assignor to Phillips Petroleum Company, a corporation of Delaware Application October 25, 1949, Serial No. 123,415

4 Claims. (Cl. 137—608)

This invention provides a telescoping bored-plug type sub-circulation valve which can be employed to protect formations from excessive pressures during the completion or reconditioning of a well, for example an oil well. In one of its aspects the invention relates to a telescoping bored-plug type valve having a bored plug seating at two places of contact intermediate of which is a resilient sealing member. In another of its aspects the invention relates to a telescoping bored-plug type valve which is opened by a pulling motion. In another of its aspects the invention relates to a telescoping bored-plug type valve in which the faces of the valve are at a substantial distance from their respective seats before any high rate of flow is permitted thereby. Still in a further aspect the invention relates to a telescoping bored-plug sub-circulation type valve in which the valve seats are so arranged in respect of the discharge ports or orifices of the valve that full rate of flow can be accomplished from a substantially zero rate of flow by an extremely slight vertical motion of said plug valve in respect of its seats, while simultaneously, in the very short interval of time required to establish the full rate of flow, the valve faces and their seats are placed out of the main path of said flow with advantages which are obvious.

It is known that fluids under pressure will erode a valve face and/or its seat particularly when the valve is partially open at which time there is a substantial pressure reduction across the valve opening and a high rate of flow of fluid through the valve. When the fluid is a drilling mud or contains sandy material the erosion or wire drawing effect upon the valve faces and seats is increased resulting in frequent replacement or machining and grinding of the seats and faces. It is also known to provide valves with seats made from a resilient sealing material in order to minimize the wire drawing effect as well as reduce replacement cost. It has now been found that an improved valve can be made if it is provided with two separate metal to metal seals intermediate of which there is provided a resilient sealing member, the said resilient sealing member and metal to metal seals being so designed into the valve that they are not in the line of the eroding flow caused by a partially opened valve and that such design will permit establishing instantaneously full flow through such a valve.

Thus, among the objects of the present invention is the provision of a bored-plug type sub-circulation valve.

Also among the said objects is the provision of a bored type, sub-circulation valve having a resilient sealing member protected on both its sides by metal to metal seals.

Further among said objects is the provision of a bored type sub-circulation valve in which the valve, valve seats, and the resilient sealing member are quickly withdrawn from the line of flow to protect the same against wire drawing or other deterioration which may otherwise be caused by the fluids or solids contained in the fluids flowing through said valve.

Still further it is an object of this invention to provide a bored type sub-circulation valve, as aforesaid, by means of which a full flow can be quickly established.

Other objects and advantages of the invention are apparent from this disclosure, its appended claims and the drawing.

According to this invention there is provided a sub-circulation valve adapted for use in a well which comprises a bored supporting head provided with at least two beveled seating surfaces disposed one below the other, the lower surface having a smaller diameter than the upper surface and a resilient sealing member engaging surface or shoulder between said beveled surfaces; a ported body supported by said head, said body containing a bored telescopically slidable member adapted to fit in sealing engagement to said beveled seating surfaces and said resilient sealing member engaging surface or shoulder, and a resilient sealing member on said sealing member engaging surface or shoulder.

The bore hole in the slidable member is of sufficient diameter that a ball or equivalent may pass therethrough, but the bore hole in the supporting head is of reduced diameter so that the ball prevents flow through the supporting head.

To more fully set forth and to describe the invention reference will be made now to the drawing which illustrates an embodiment thereof in several figures of which Figure 1 is an elevational view showing a valve according to this invention attached to a conventional packer and perforated nipple or tail pipe, the several elements mentioned being connected by a string of tubing in a well casing which is shown in cross-sectional view; Figure 2 is an elevational cross-section view showing the detailed construction of the valve, in closed position, but without a ball; Figure 3 shows the detailed construction of the valve, in open position, in elevational cross-section; and Figure 4 is a cross-sectional view taken along line 4—4 of Figure 3.

In order to better understand the operation, usefulness and advantages of a valve according to this invention its adaptation in Figure 1 will now be described. The valve shown is in its open position (see Figure 3) which will allow the flow of fluid under pressure through the tubing down into the well out through the valve and up through the annulus formed by the tubing and the casing. It should be noted that the conventional packer is retained in position by the slips which, in turn, are maintained in position by the weight of the perforated tail pipe and, of course, the length of pipe between the packer and the sub-circulation valve. The valve is maintained in open position by lifting the entire string of tubing above the sub-circulation valve, care being taken so that the lower part of the valve is not lifted. Conversely it should be obvious that, when the sub-circulation valve is in closed position, as shown in Figure 2, the entire weight of the string of tubing above the sub-circulation valve helps to maintain the slips against the casing. Although the packer is conventional it may be said that it is moved by lifting the tubing still further so that the weight of the tail pipe is released from the slips, which allow the friction springs to forcibly remove the slips from engagement with the casing. During this lifting the pin is raised to the height of the J slot. The tubing can then be rotated a slight amount so that the pin will be locked within the J slot so that the packer can be moved anywhere within the casing without the slips catching on the casing. Of course, the opposite procedure is used to set the packer.

In Figure 2, there is shown a member 6 which is threaded or otherwise adapted to be suspended by a string of tubing and is bored to allow free passage of fluid therethrough. Depending from member 6 is a ported body 7 with perforations or radial ports 8 and formed at its lower end 9 to slidingly engage splines 10 of supporting head 11. Member 11 which is threaded or otherwise adapted to engage a tube or the packer and bored so that fluid can be passed therethrough also contains a seat 20 which coacts with ball 19 (shown in Figure 3) to prevent flow through the supporting head 11. Thus, as shown in Figure 2, a valve of this invention in closed position is in effect an open tube. Member 6 is beveled at 12 and 13 and is provided with a shoulder 14. Supporting head 11 is formed complementary to member 6 with beveled surfaces 15 and 16 and a shoulder 17. A resilient sealing material 18 is provided to fit on shoulder 17. In closed position the beveled surfaces of supporting head 11 are in contact with the corresponding beveled surfaces of member 6 and sealing material 18 is compressed between shoulders 14 and 17.

In Figure 3 the valve is in opened position and a ball 19 rests in ball seat 20. Therefore, fluid entering the valve will pass out from the valve through ports 8, or vice versa.

In Figure 4 the splines 10 on support body 11 coact with grooves within ported body 7 so that ported body 7 can slide on body 11 but yet provide means of rotation so that the packer may be set.

From the foregoing it will be noted that not only is the resilient sealing member protected by the beveled seating surfaces on both sides of it but that it in turn prevents wire drawing of said beveled seating surfaces by preventing any substantial fluid flow until there is provided a sufficient space to accommodate the flow at normal velocity. It is to be noted that the high fluid velocity across a partially opened valve quickly erodes the valve face and/or seats. It is also noted that the beveled sealing surfaces, as well as the resilient sealing material and the shoulders with which it coacts, are away from the line of flow and will, therefore, not be subjected to any extended erosion or other deterioration which may be caused by said flow. It is further noted that the valve can be instantaneously opened, or closed fully, thus limiting sharply the time during which any rapid flow will take place between the beveled surfaces and over the shoulders and resilient sealing material due to pressure drop.

Reasonable variation and modification are possible within the foregoing disclosure and the appended claims to the invention, the essence of which is that a bored plug-type sub-circulation valve has been set forth having the design characteristics and advantages herein described.

I claim:

1. A bored plug-type substantially cylindrical sub-circulation valve which comprises in combination a bored supporting head, provided with at least two beveled seating surfaces disposed one below the other and having different diameters, said beveled seating surfaces being separated by at least two cylindrical surfaces coaxial with said bore in said head, said cylindrical surfaces also having different diameters, a resilient sealing member engaging shoulder disposed intermediate said cylindrical surfaces, a tubular body having at least one port therein telescopically mounted on said supporting head, said body having a bored member adapted in valve closed position to simultaneously fit in sealing engagement with said seating surfaces and a resilient sealing member disposed on said resilient sealing member engaging shoulder, said port being disposed between the cooperating seating surfaces of the supporting head and bored member in the valve open position to establish full communication between said port and the bore in said bored member, and said port being covered by said supporting head upon said ported body being reciprocally moved with respect to said supporting head to bring the cooperating seating surfaces of the supporting head and bored member in sealing engagement.

2. The valve of claim 1 in which the bore of the bored supporting head is adapted to receive and to sealingly retain at its upper end a sealing member to prevent downflow through said bore and a sealing member retained upon said upper end.

3. A bored plug-type substantially cylindrical sub-circulation valve which comprises in combination a bored supporting head, provided with at least two beveled seating surfaces disposed one below the other and substantially at right angles to the longitudinal axis of the head, the lower beveled seating surface having a smaller diameter than the upper surface, said beveled seating surfaces being separated by at least two cylindrical surfaces coaxial with said bore in said head, said cylindrical surfaces also having different diameters; a resilient sealing member engaging shoulder between said cylindrical surfaces; a resilient sealing member on said resilient member engaging shoulder; a tubular body having at least one port therein telescopically mounted on said supporting head; said body having a bored member adapted in valve closed position to simultaneously fit in sealing engagement with said beveled surfaces and said resilient sealing member; said port being disposed between the cooperating seating surfaces of the supporting head and bored member in the valve open position to establish full communication between said port and the bore in said bored member, and said port being covered by said supporting head upon said ported body being reciprocally moved with respect to said supporting head to bring the cooperating seating surfaces of the supporting head and bored member in sealing engagement.

4. A valve according to claim 3 in which the bore of the bored supporting head is adapted to receive and to sealingly retain at its upper end a sealing member to prevent downflow through said bore and a sealing member retained upon said upper end.

ROBERT COLLINS PRYOR.

References Cited in the file of this patent

UNITED STATES PATENTS

| Number | Name | Date |
|---|---|---|
| 676,580 | French | June 18, 1901 |
| 1,193,849 | Viger | Aug. 8, 1916 |
| 1,317,563 | Eckenroth | Sept. 30, 1919 |
| 2,077,911 | Van Voorhis | Apr. 20, 1937 |
| 2,083,584 | Wineman | June 15, 1937 |
| 2,275,938 | Baker | Mar. 10, 1942 |
| 2,372,629 | Nelson | Mar. 27, 1945 |